July 28, 1953     J. P. MAGOS ET AL     2,646,997
FLANGED PIPE JOINT
Filed July 30, 1949     4 Sheets-Sheet 1

Inventors.
Edmond P. DeCraene,
Edward G. Schmidt, &
John P. Magos.
By Joseph O. Lang July 28, 1953  J. P. MAGOS ET AL  2,646,997
FLANGED PIPE JOINT
Filed July 30, 1949  4 Sheets-Sheet 4
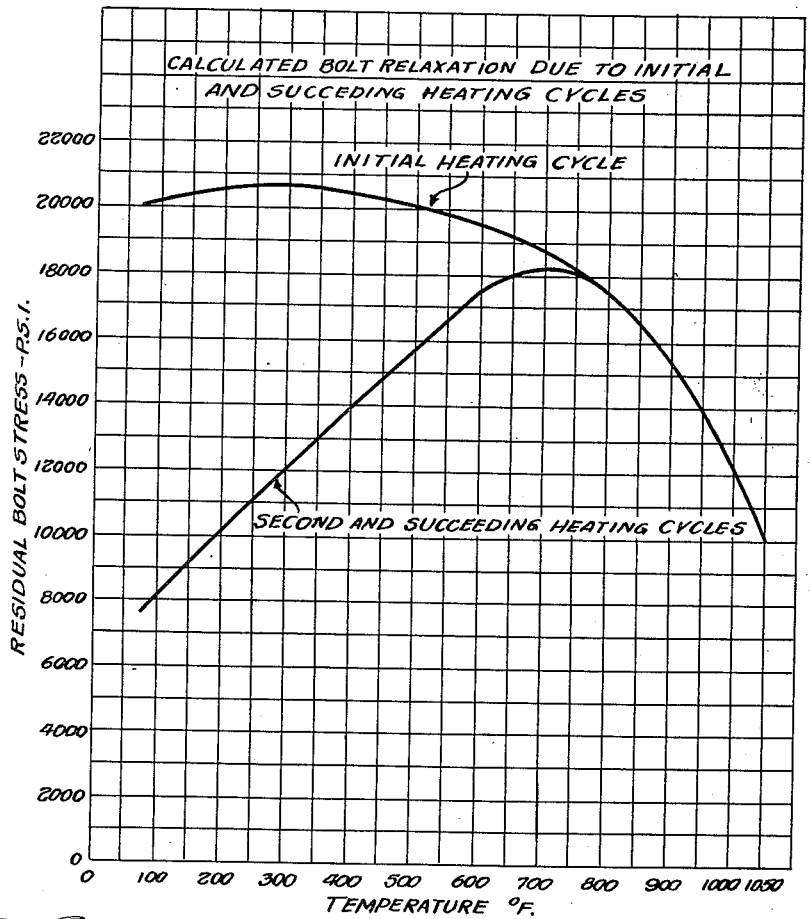
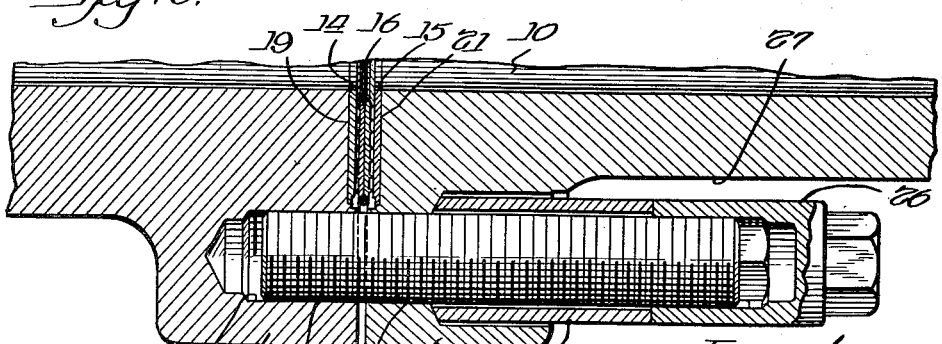
Inventors.
Edmond P. DeGraene,
Edward G. Schmidt, &
John P. Magos.
By Joseph O. Lange Atty.

Patented July 28, 1953

2,646,997

UNITED STATES PATENT OFFICE 2,646,997

FLANGED PIPE JOINT

John P. Magos, Wilmette, Edward G. Schmidt, La Grange, and Edmond P. De Craene, Westchester, Ill., assignors to Crane Co., Chicago, Ill., a corporation of Illinois Application July 30, 1949, Serial No. 107,704

6 Claims. (Cl. 285—139)

This invention relates broadly to a flanged pipe joint or coupling.

More particularly, it is an important object of this invention to provide a mechanical flanged joint for connecting piping, tubing, or the like having widely different coefficients of linear expansion and for maintaining tightness at high internal pressures and temperatures under such circumstances with a minimum of bolting and excessive flange mass. It is a further object to provide a flanged pipe assembly capable of maintaining tightness under the severe condition of thermal shock.

In connection with the foregoing objects, it should be understood at the outset that the increased utilization of higher steam pressures and temperatures, such as are being encountered in the field of central station work, manufacturing, processing, oil refineries, and the like, together with the employment of piping materials having widely different coefficients of thermal expansion, the use of a mechanical joint for connecting these different materials has presented an unusual and relatively difficult problem.

Thus, it is a further object to provide for coupling means in which there is less bulk, and, therefore, the joint assembly is maintained more economically because of employing lighter bolting to make both the installation and the disassembly easier.

In consideration of the foregoing objects, the discovery has been made that improved results in all-around performance can be obtained when the materials for the pipe joint gasket and the flange facing are selected, so as to have coefficients of linear expansion that are substantially equal and that are preferably intermediate between the coefficients of linear expansion of the two unlike flange materials to be joined by the coupling.

One of the advantages of the foregoing combination lies in the further discovery that the gasket and flange facing materials then have sufficient ductility to withstand the strains imposed upon them by the operating conditions and that, as hereinafter explained, these conditions provide for the transition of differential radial flange movement caused by elevated temperatures and thermal shock conditions in reduced stages, so that actual differential movement at the mechanical junction is held to a minimum.

Other objects and advantages will become more readily apparent upon proceeding with the following specification read in light of the accompanying drawings, in which.

Figure 3:
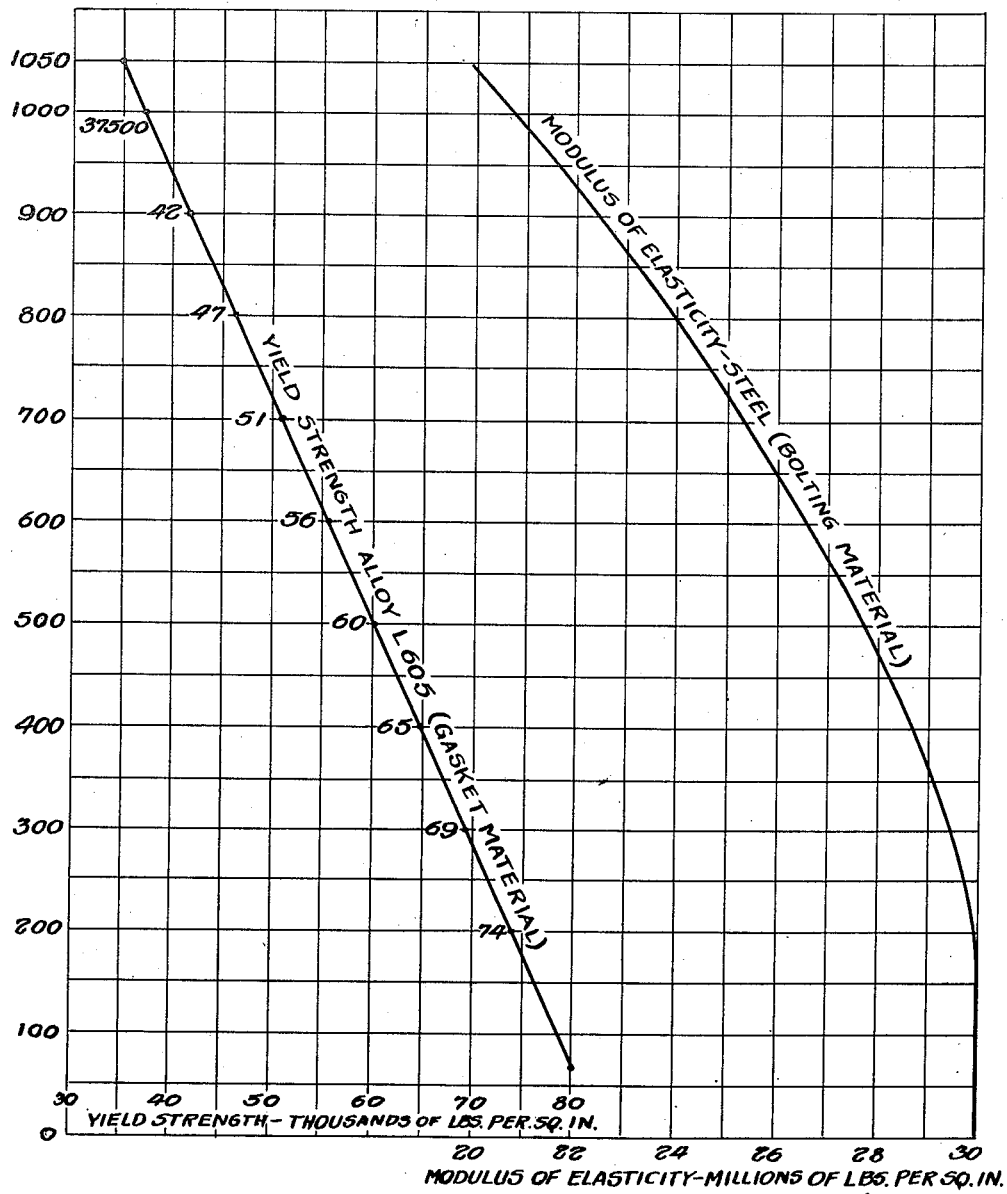
Figure 4:
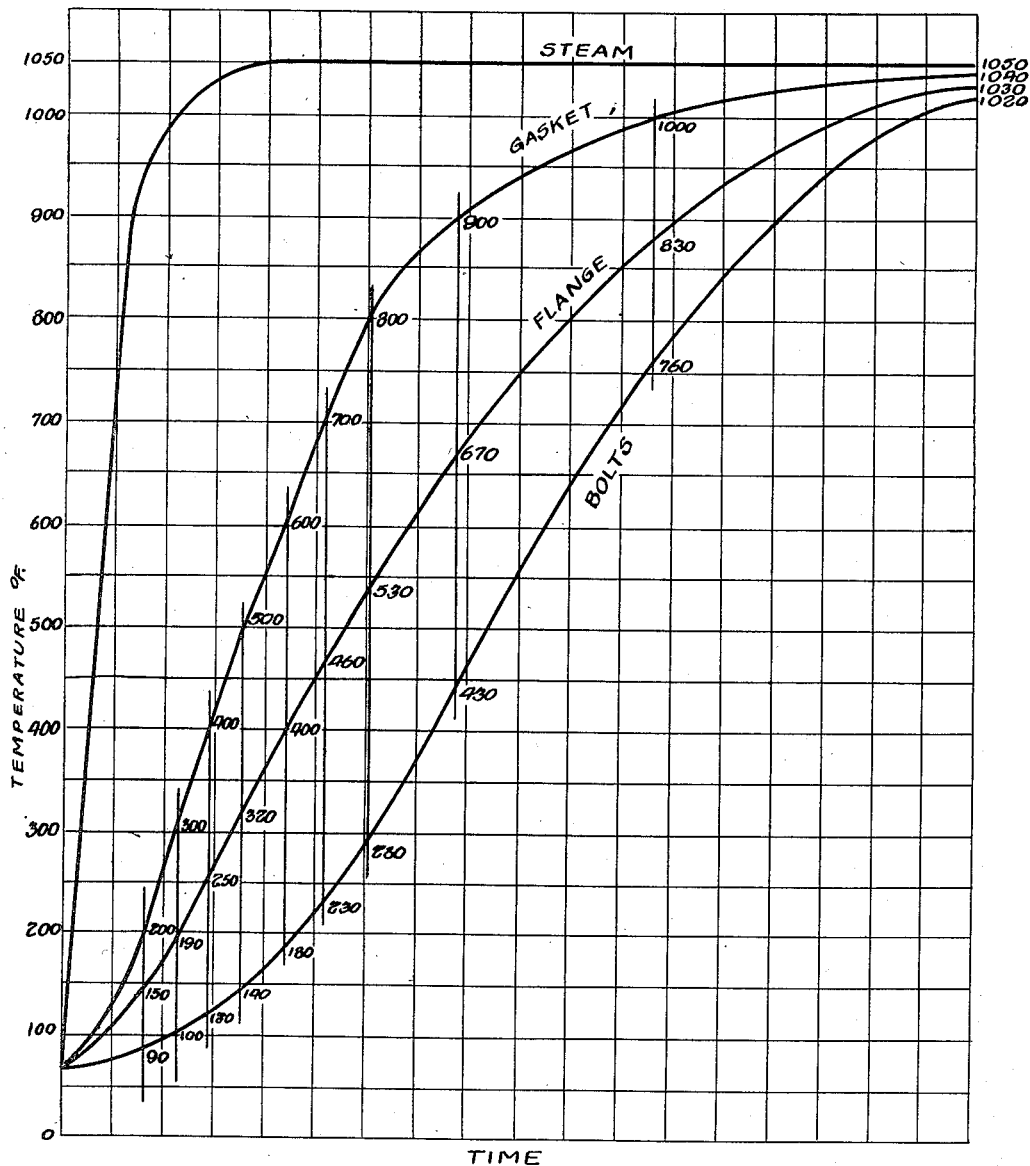

Figs. 3, 4, and 5 are graphs based upon performance and tests of couplings embodying the invention.

Fig. 6 is a fragmentary sectional view of a modified form of the invention.

Similar reference numerals refer to similar parts throughout the several views.

Figure 1:
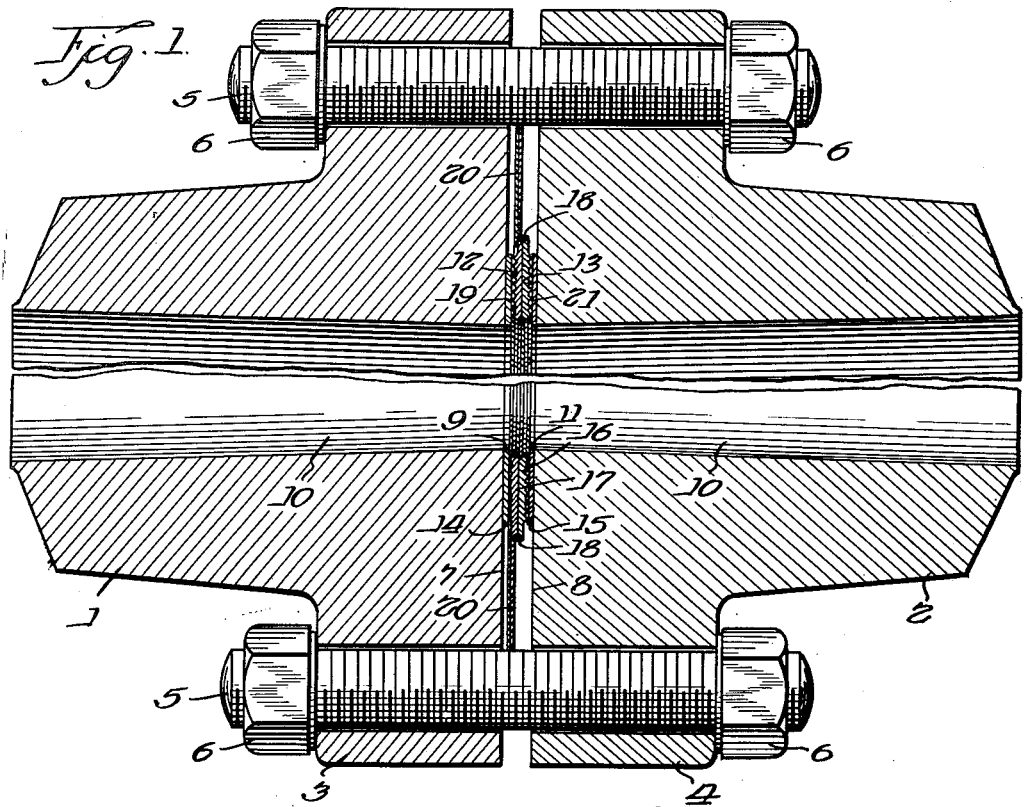
Fig. 1 is a fragmentary sectional view of a conventional joint assembly embodying our invention.
Figure 2:
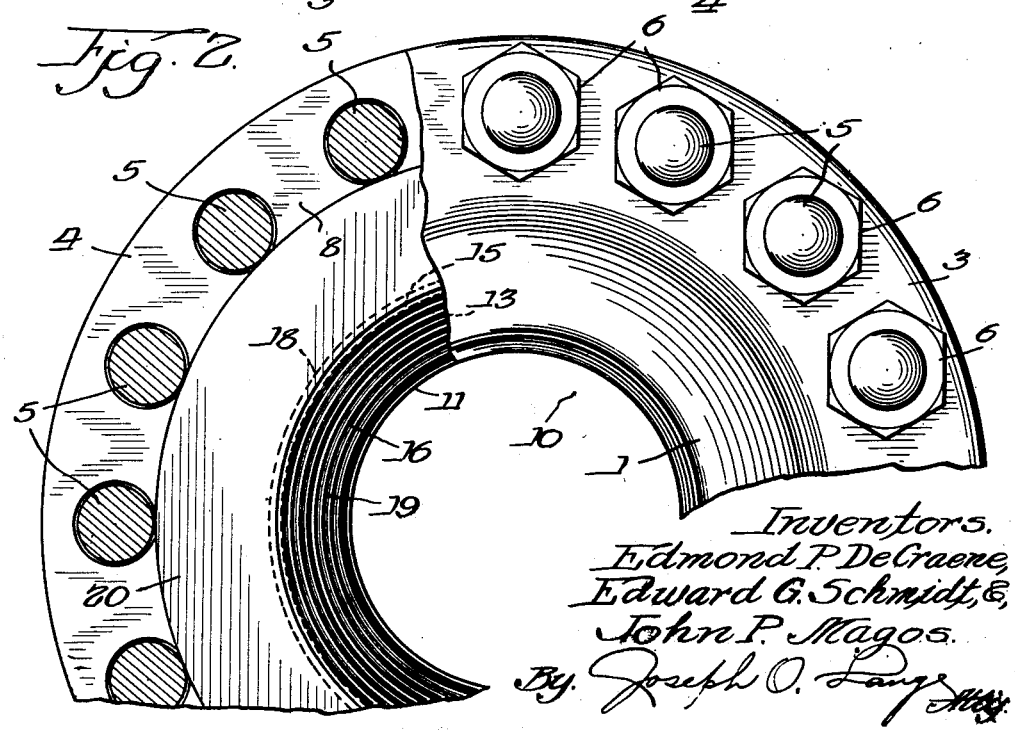
Fig. 2 is an end view of the assembly referred to in Fig. 1.

Referring now to Fig. 1, tubular members 1 and 2 having the flange portions respectively 3 and 4 are provided with the studs 5 and the nuts 6 to draw the said flanges together, the latter bolting being arranged as shown more clearly in Fig. 2. The flanges 3 and 4 on their oppositely disposed faces 7 and 8 are provided with a cobalt base deposit 9 and 11, respectively, provided with finished ground surfaces 12 and 13 and extending from the port or passage 10 outwardly, as indicated at 14 and 15 respectively, to permit the interposition of the gasket which is generally referred to as 16. As indicated at 17, the gasket 16 is split and is preferably weld-sealed at its outer periphery, as at 18, for reasons hereinafter explained at greater length. Also, the contact faces of the gasket 16 are preferably corrugated, as indicated at 19 and 21, and make contact as illustrated with the respective machined surfaces 12 and 13 of the cobalt base deposits 9 and 11 applied on the flanges 3 and 4.

From a structural point of view, it should be noted that this type of joint structure is not substantially different from joints heretofore supplied.

However, in connection with the gasket 16 and the flange facings 9 and 11, it is important to understand that a novel feature of this invention lies in the fact that the materials used for the gasket and the flange facings have equal coefficients of expansion and that their respective coefficients of expansion are intermediate the coefficient of linear expansion of the two unlike flange materials. Thus, it should be understood that the tubing 1 and the flange 3 are assumed by reason of necessity to have different coefficients of expansion than the tubing 2 and the flange 4.

The material for the bolting 5 and 6 possesses high physical properties at elevated temperatures as well as providing a coefficient of linear expansion that is intermediate between those of the flange materials, thereby making it possible to maintain bolt loads at changing temperatures that are within the allowable limits of the material and that will be sufficient to overcome the internal pressure load in spite of progressive compression of the gasket due to the yielding of the latter at elevated temperatures.

In further explanation, it should be understood that the joint of this invention provides for the loading of the gasket contact surfaces to the yield point of the gasket material at assembly.

As shown more clearly in the graph of Fig. 3, since the yield strength of material is reduced by increasing temperatures, it should be apparent that the gasket will be progressively compressed until maximum service temperature and at the same time minimum yield strength is reached.

In obtaining a better appreciation of the background of this invention, it should be further understood that during the warming up of the joint there is a temperature gradient across the various parts of the joint that has been approximately defined and established by tests, as illustrated in Fig. 4. Furthermore, the stress imposed upon the bolting by a given amount of elongation is a function of Young's modulus of elasticity which varies with temperature as shown in Fig. 3.

Summarizing the above conditions and their effect on bolt stress:

1. Gasket compression decreases bolt stress.
2. Differential flange and bolt expansion due to varying coefficients of expansion as well as lag of bolt temperature behind flange and gasket temperatures during warm-up causes an increase in bolt stress.
3. Decrease in Young's modulus of elasticity for bolt material with increase in temperature causes a decrease in bolt stress.

It will be seen from the above outline that in order to maintain bolt stresses within allowable limits and sufficient to overcome the loads due to internal pressure, it is necessary to design the gasket and the joint so that the above effects will tend to balance each other. In this case, the gasket is designed so that the decrease in thickness is about five percent of the increase in face width due to upsetting. This is done by regulating the shape and number of the raised ribs on the gasket to obtain this effect.

It can be readily seen that the product of the gasket contact area and its yield strength must at all times be equal to or greater than the residual bolt load. From this, the following equation may be written and an analysis of the conditions during warm-up of the joint on this basis is shown in Fig. 5.

$$Y[C(w+a)] = A\left[S + \frac{e - \frac{a}{20}}{l}E\right]$$

where:

$Y$ = Yield strength of gasket at temperature being considered—see Fig. 3.
$E$ = Young's modulus of elasticity for bolting material at the temperature being considered—see Fig. 3.
$a$ = Increase in face width of gasket contact surface due to upsetting as a result of reduced yield strength at elevated temperatures.
$C$ = Mean circumference of gasket ribs.
$w$ = Initial face width of gasket contact surface.
$A$ = Total bolt area.
$S$ = Initial applied bolt stress, p. s. i.
$e$ = Differential expansion of bolts and flanges as calculated on basis of coefficients of linear expansion of the different materials used and differential temperatures per Fig. 4.
$l$ = Effective length of bolt over which stresses are distributed.

In further considering the aspects of this invention, it should be realized that flanges are designed in accordance with accepted formulas recommended in the Boiler Construction Code for Unfired Pressure Vessels, sponsored by the American Society of Mechanical Engineers (A. S. M. E.), to have maximum stresses within the limits prescribed in the said code.

Referring now to the modified structure shown in Fig. 6, what is termed a studded bolt design is illustrated, although through-bolts could be used. It has been found by tests that the studded design gives a better conduction of heat between flanges and bolts, and thus reduces the temperature differential between these parts of the joint during the warm-up previously referred to and also under conditions of thermal shock. It has also been found that the use of studs permits a considerable reduction in the dimensions respectively of the bolt circle and flange diameter in view of the substantial difference in strength of the two piping materials being joined, which permits a considerable reduction in pipe wall thickness of the higher strength side. This reduction in flange mass also reduces the temperature gradient between various portions of the joint, because a small mass will obviously heat faster and reach a condition of temperature equilibrium more rapidly than a larger mass of metal.

In the course of the operation of a power plant, the piping is sometimes inadvertently subjected to thermal shock conditions resulting from injection of saturated steam or even water into the superheated steam lines. The effect of such a thermal shock on a flanged joint is to greatly reduce the bolt load because the joint cools from the inside, thereby leaving the bolts at a higher temperature than the flanges. In the joint shown in Fig. 6, tightness under these conditions is maintained by means of the pressure sealing feature of the gasket, even though the bolt load due to nut tightness might drop below that created by the pressure.

Referring further to Fig. 6, the flanged tubing 1 and 2 are assembled in the usual manner, but the flange 3 is tapped, as at 22, for reception of the studs 23 which extend through an aperture 24 of the flange 4. The bolting in other respects follows the structure previously described in connection with Figs. 1 and 2.

The collars 25 under the nuts 26 are made with a cross-sectional area, preferably equal to that of the bolts. Thus, when the bolts are stressed in tension to a given amount, the collars are stressed in compression in equal amount, and thus the effect of the collars 25 is to distribute the stresses due to differential expansion of flanges 3 and 4 and studs 23 over a length equal to the center to center of the bolt thread engagements plus the length of the collar 25. While it is realized that the use of this construction increases the effective bolt length that is subject to creep, nevertheless it is also realized that the advantage gained in the reduction of a change in the bolt stress is of a higher value in view of the fact that bolts 23 are made of a material preferably having high creep resistance.

The embodiments illustrated and described are for purpose of merely setting forth examples of this invention, and it should, therefore, be understood that such description should not be regarded as a limitation. The measure of the invention is to be construed by the appended claims interpreted in light of the art.

We claim:

1. In connecting means for tubular members forming a substantially continuous port therebetween, the combination comprising of a pair of flanged tubular members having substantially different coefficients of linear expansion, a gasket interposed between the abutting surfaces of the flanged tubular members, the said gasket being made of a material having a coefficient of expansion intermediate to those of the two piping materials, the said flanged tubular members having oppositely disposed faces of a weld deposited material similar in coefficient of linear expansion to that of said gasket, bolting means for drawing the said flanged tubular members together in substantial abutting relation.

2. In connecting means for tubular members forming a substantially continuous port therebetween, the combination comprising of a pair of tubular members having substantially different coefficients of linear expansion, a gasket interposed between the abutting surfaces of the flanged tubular members, the said gasket being made of a metal having a coefficient of linear expansion intermediate to those of the two piping materials, the said flanged tubular members having oppositely disposed faces of a material similar in coefficient of linear expansion to that of said gasket, means for drawing the said tubular members together in substantial abutting relation.

3. In connecting means for tubular members forming a substantially continuous port therebetween, the combination comprising of a pair of flanged tubular members having substantially different coefficients of linear expansion, a flat plate gasket interposed between the abutting surfaces of the flanged tubular members, the said gasket being made of a metal having a coefficient of expansion intermediate to those of the two piping materials, the said flanged tubular members having oppositely disposed faces of a weld deposited material similar in coefficient of linear expansion to that of said gasket, bolting means for drawing the said flanged tubular members together in substantial abutting relation, the said bolting means including a plurality of annularly arranged spaced-apart studs and nuts, collars under the said nuts, the collars having substantially an area equal to that of said studs whereby when said studs are stressed in tension in completing assembly of the connecting means, the said collars are stressed in compression in equal amounts.

4. In connecting means for tubular members forming a substantially continuous port therebetween, the combination comprising a pair of oppositely disposed flanged tubular members composed of materials having substantially different coefficients of expansion, a plate type gasket intermediate abutting surfaces of said flanged tubular members, bolting means for drawing the said flanged tubular members together in substantial abutting relation, the said gasket and said bolting means being composed of materials having coefficients of expansion intermediate to those of the materials of the flanged tubular members.

5. In connecting means for tubular members forming a substantially continuous port therebetween, the combination comprising a pair of oppositely disposed flanged tubular members composed of materials having substantially different coefficients of expansion, a plate type gasket interposed between abutting surfaces of said flanged tubular members, bolting means for drawing the said flanged tubular members together in substantial abutting relation, the material of said bolting means and gasket having a coefficient of expansion intermediate to those materials comprising the two flanged tubular members.

6. In connecting means for tubular members forming a substantially continuous port therebetween, the combination comprising a pair of flanged tubular members composed of materials having substantially different coefficients of expansion, a bellows type gasket interposed between the abutting surfaces of said flanged tubular members thereby to effect a joint sealed by line fluid pressure acting within said bellows gasket, the said gasket being composed of a material having a coefficient of expansion intermediate to those of the two piping materials, and joining means for drawing the said tubular members together in substantial abutting relation having a coefficient of expansion intermediate to that of the piping materials.

JOHN P. MAGOS.
EDWARD G. SCHMIDT.
EDMOND P. DE CRAENE.

References Cited in the file of this patent

UNITED STATES PATENTS

| Number | Name | Date |
|---|---|---|
| 805,645 | Guillott | Mar. 19, 1904 |
| 2,299,813 | Franks | Oct. 27, 1942 |

FOREIGN PATENTS

| Number | Country | Date |
|---|---|---|
| 567,159 | Great Britain | Jan. 31, 1945 |

OTHER REFERENCES

Crane Co. catalog No. 52 of valves-fittings, pipe and fabricated piping, 836 S. Michigan Ave., Chicago, Ill. (Book to be found in Div. 57.)